United States Patent
Mizuno et al.

(10) Patent No.: US 12,159,530 B2
(45) Date of Patent: Dec. 3, 2024

(54) CONTROL APPARATUS, METHOD, AND NON-TRANSITORY COMPUTER READABLE MEDIUM

(71) Applicant: TOYOTA JIDOSHA KABUSHIKI KAISHA, Toyota (JP)

(72) Inventors: Yuko Mizuno, Nagoya (JP); Shota Minami, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 261 days.

(21) Appl. No.: 17/551,805

(22) Filed: Dec. 15, 2021

(65) Prior Publication Data

US 2022/0198919 A1 Jun. 23, 2022

(30) Foreign Application Priority Data

Dec. 18, 2020 (JP) .................. 2020-210650

(51) Int. Cl.
| | |
|---|---|
| *G08G 1/005* | (2006.01) |
| *G06V 20/54* | (2022.01) |
| *G06V 40/10* | (2022.01) |
| *G08G 1/01* | (2006.01) |
| *G08G 1/017* | (2006.01) |
| *G08G 1/056* | (2006.01) |
| *G08G 1/16* | (2006.01) |

(52) U.S. Cl.
CPC .......... *G08G 1/005* (2013.01); *G06V 20/54* (2022.01); *G06V 40/103* (2022.01); *G08G 1/0116* (2013.01); *G08G 1/0145* (2013.01); *G08G 1/017* (2013.01); *G08G 1/056* (2013.01); *G08G 1/164* (2013.01); *G08G 1/166* (2013.01); *G06V 2201/08* (2022.01)

(58) Field of Classification Search
CPC .... G08G 1/005; G08G 1/0116; G08G 1/0145; G08G 1/017; G08G 1/056; G08G 1/164; G08G 1/166; G06V 20/54; G06V 40/103; G06V 2201/08
See application file for complete search history.

(56) References Cited

U.S. PATENT DOCUMENTS

| | | | |
|---|---|---|---|
| 6,384,742 | B1 | 5/2002 | Harrison |
| 7,688,222 | B2 | 3/2010 | Peddie et al. |
| 7,859,431 | B2 | 12/2010 | Peddie et al. |

(Continued)

FOREIGN PATENT DOCUMENTS

| | | |
|---|---|---|
| CN | 204010322 U | 12/2014 |
| CN | 110288822 A | 9/2019 |

(Continued)

OTHER PUBLICATIONS

Dec. 8, 2022 Notice of Allowance issued in U.S. Appl. No. 17/550,626.
Oct. 14, 2022 Office Action issued in U.S. Appl. No. 17/550,626.

*Primary Examiner* — Sisay Yacob
(74) *Attorney, Agent, or Firm* — Oliff PLC (57) ABSTRACT

A control apparatus, for displaying a crosswalk on a road upon detecting a pedestrian who is about to cross the road, includes a controller configured to acquire vehicle information including information indicating whether there is a vehicle about to enter the road, and determine whether to display the crosswalk based on the vehicle information.

17 Claims, 6 Drawing Sheets

(56) References Cited

U.S. PATENT DOCUMENTS

| | | |
|---|---|---|
| 9,652,981 B2 | 5/2017 | Liu |
| 9,976,714 B2 | 5/2018 | Geisler et al. |
| 10,002,536 B2 | 6/2018 | Kim et al. |
| 11,355,006 B1 | 6/2022 | Cho et al. |
| 2005/0104747 A1 | 5/2005 | Silic et al. |
| 2005/0270175 A1* | 12/2005 | Peddie ............. G08G 1/096783 246/473 R |
| 2009/0256723 A1* | 10/2009 | Peddie ............. G08G 1/096783 340/907 |
| 2016/0366543 A1 | 12/2016 | Berry |
| 2017/0005717 A1 | 1/2017 | Berry |
| 2017/0018187 A1 | 1/2017 | Kim et al. |
| 2017/0030538 A1* | 2/2017 | Geisler ............... F21V 23/0407 |
| 2017/0038018 A1 | 2/2017 | Johnson et al. |
| 2017/0288722 A1 | 10/2017 | Berry |
| 2017/0289821 A1 | 10/2017 | Berry |
| 2017/0306577 A1* | 10/2017 | Trifan .................... F21S 8/032 |
| 2019/0088112 A1* | 3/2019 | Jung ...................... G08G 1/166 |
| 2019/0287403 A1* | 9/2019 | Aoude ............. G08G 1/096725 |
| 2020/0265719 A1* | 8/2020 | Swan .................... G08G 1/166 |
| 2022/0012988 A1 | 1/2022 | Avadhanam et al. |

FOREIGN PATENT DOCUMENTS

| | | |
|---|---|---|
| JP | H03182998 A | 8/1991 |
| JP | 2006113659 A | 4/2006 |
| JP | 2012-62718 A | 3/2012 |
| JP | 2014-225151 A | 12/2014 |
| JP | 2015-90599 A | 5/2015 |
| JP | 2019-36147 A | 3/2019 |
| KR | 102162561 B1 | 10/2020 |

\* cited by examiner

CONTROL APPARATUS, METHOD, AND NON-TRANSITORY COMPUTER READABLE MEDIUM

CROSS-REFERENCE TO RELATED APPLICATION

This application claims priority to Japanese Patent Application No. 2020-210650, filed on Dec. 18, 2020, the entire contents of which are incorporated herein by reference.

TECHNICAL FIELD

The present disclosure relates to a control apparatus, a method, and a program.

BACKGROUND

Technology for notifying surrounding vehicles of the presence of a pedestrian when the pedestrian begins to cross a road is known. For example, Patent Literature (PTL) 1 describes technology for transmitting a stop request signal to a vehicle approaching a road that has been determined as potentially being crossed by a pedestrian.

CITATION LIST

Patent Literature

PTL 1: JP 2014-225151 A

SUMMARY

There is room for improvement in the safety of pedestrians when crossing the road in a case in which a crosswalk can be displayed anywhere on the road.

It would be helpful to improve the safety of pedestrians when crossing the road.

A control apparatus according to the present disclosure is for displaying a crosswalk on a road upon detecting a pedestrian who is about to cross the road, the control apparatus including a controller configured to:
acquire vehicle information including information indicating whether there is a vehicle about to enter the road; and
determine whether to display the crosswalk based on the vehicle information.

A method according to the present disclosure is a method to be executed by a control apparatus for displaying a crosswalk on a road upon detecting a pedestrian who is about to cross the road, the method including:
acquiring vehicle information including information indicating whether there is a vehicle about to enter the road; and
determining whether to display the crosswalk based on the vehicle information.

A program according to the present disclosure causes a computer, as a control apparatus for displaying a crosswalk on a road upon detecting a pedestrian who is about to cross the road, to execute operations including:
acquiring vehicle information including information indicating whether there is a vehicle about to enter the road; and
determining whether to display the crosswalk based on the vehicle information.

According to the present embodiment, the safety of pedestrians when crossing the road can be improved.

DETAILED DESCRIPTION

Hereinafter, an embodiment of the present disclosure will be described with reference to the drawings. In the drawings, the same or corresponding portions are denoted by the same reference numerals. In the descriptions of the present embodiment, detailed descriptions of the same or corresponding portions are omitted or simplified, as appropriate.

A configuration of a system 10 according to the present embodiment will be described with reference to FIG. 1.

The system 10 according to the present embodiment includes a control apparatus 20 and one or more light-emitting apparatuses 30. The control apparatus 20 can communicate with the light-emitting apparatuses 30 via a network 40.

The network 40 includes the Internet, at least one WAN, at least one MAN, or a combination thereof. The term "WAN" is an abbreviation of wide area network. The term "MAN" is an abbreviation of metropolitan area network. The network 40 may include at least one wireless network, at least one optical network, or a combination thereof. The wireless network is, for example, an ad hoc network, a cellular network, a wireless LAN, a satellite communication network, or a terrestrial microwave network. The term "LAN" is an abbreviation of local area network.

The control apparatus 20 may be installed in a facility such as a data center. The control apparatus 20 may, for example, be a server that belongs to a cloud computing system or another type of computing system.

The light-emitting apparatuses 30 have a communication function and a light-emitting function using a light-emitting element, and are laid on the road. The light-emitting apparatuses 30 are controlled by the control apparatus 20, and each can turn a light-emitting element on or off. Any portion of the plurality of light-emitting apparatuses 30 is selected and controlled to turn on. This enables the light-emitting apparatuses 30 to turn on to represent the shape of a crosswalk. A pedestrian P can cross the road by crossing the crosswalk displayed by the light-emitting apparatuses 30.

First, an outline of the present embodiment will be described, and details thereof will be described later. Upon detecting a pedestrian about to cross the road, the control apparatus 20 displays a crosswalk on the road. The control apparatus 20 acquires vehicle information including information indicating whether there is a vehicle about to enter the road and determines whether to display the crosswalk based on the vehicle information.

In this way, according to the present embodiment, it is determined whether to display a crosswalk based on vehicle information indicating whether there is a vehicle. Hence, a crosswalk can be displayed to pedestrians in a case in which there is no vehicle about to enter the road, for example, but not displayed in a case in which there is a vehicle. Also, for example, even in a case in which a vehicle is at a location not visible to pedestrians, such as inside a building facing the road, pedestrians can be prevented from crossing the road by the crosswalk not being displayed. Therefore, the safety of pedestrians when crossing the road can be improved by appropriately controlling the timing at which the crosswalk is displayed.

Next, configurations of the system 10 will be described in detail.

Figure 2:
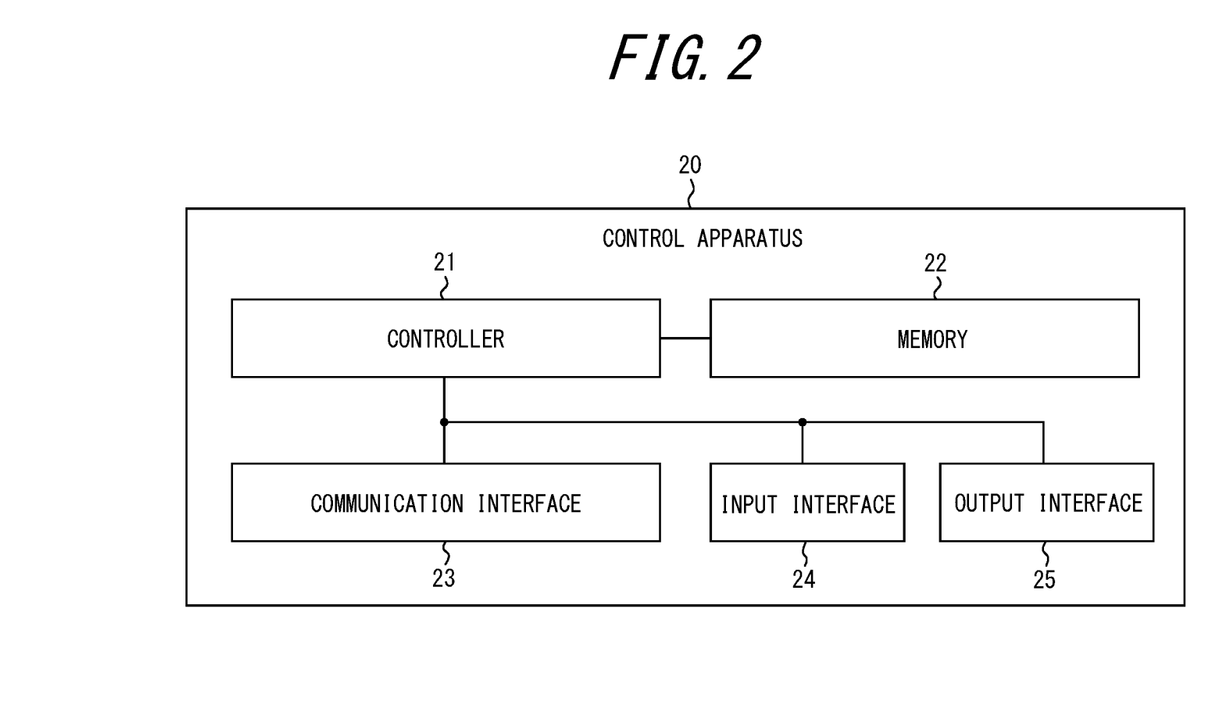
FIG. 2 is a block diagram illustrating a configuration of a control apparatus according to the present embodiment.

A configuration of the control apparatus 20 according to the present embodiment will be described with reference to FIG. 2. The control apparatus 20 includes a controller 21, a memory 22, a communication interface 23, an input interface 24, and an output interface 25.

The controller 21 includes at least one processor, at least one dedicated circuit, or a combination thereof. The processor is a general purpose processor such as a CPU or a GPU, or a dedicated processor that is dedicated to specific processing. The term "CPU" is an abbreviation of central processing unit. The term "GPU" is an abbreviation of graphics processing unit. The dedicated circuit is, for example, an FPGA or an ASIC. The term "FPGA" is an abbreviation of field-programmable gate array. The term "ASIC" is an abbreviation of application specific integrated circuit. The controller 21 executes processes related to operations of the control apparatus 20 while controlling components of the control apparatus 20.

The memory 22 includes at least one semiconductor memory, at least one magnetic memory, at least one optical memory, or a combination of at least two of these. The semiconductor memory is, for example, RAM or ROM. The term "RAM" is an abbreviation of random access memory. The term "ROM" is an abbreviation of read only memory. The RAM is, for example, SRAM or DRAM. The term "SRAM" is an abbreviation of static random access memory. The term "DRAM" is an abbreviation of dynamic random access memory. The ROM is, for example, EEPROM. The term "EEPROM" is an abbreviation of electrically erasable programmable read only memory. The memory 22 functions as, for example, a main memory, an auxiliary memory, or a cache memory. The memory 22 stores information for use in operations of the control apparatus 20 and information resulting from operations of the control apparatus 20.

The communication interface 23 includes at least one interface for communication. The interface for communication is, for example, a LAN interface. The communication interface 23 receives information to be used for the operations of the control apparatus 20, and transmits information obtained by the operations of the control apparatus 20.

The input interface 24 includes at least one interface for input. The interface for input is, for example, a physical key, a capacitive key, a pointing device, a touch screen integrally provided with a display, or a microphone. The input interface 24 accepts an operation for inputting information to be used for the operations of the control apparatus 20. The input interface 24, instead of being included in the control apparatus 20, may be connected to the control apparatus 20 as an external input device. As the connection method, any technology such as USB, HDMI®, or Bluetooth® (HDMI and Bluetooth are registered trademarks in Japan, other countries, or both) can be used. The term "USB" is an abbreviation of Universal Serial Bus. The term "HDMI®" is an abbreviation of High-Definition Multimedia Interface.

The output interface 25 includes at least one interface for output. The interface for output is, for example, a display or a speaker. The display is, for example, an LCD or an organic EL display. The term "LCD" is an abbreviation of liquid crystal display. The term "EL" is an abbreviation of electro luminescence. The output interface 25 outputs information resulting from operations of the control apparatus 20. The output interface 25, instead of being included in the control apparatus 20, may be connected to the control apparatus 20 as an external output device. As the connection method, any technology such as USB, HDMI®, or Bluetooth® can be used.

The functions of the control apparatus 20 are realized by execution of a control program according to the present embodiment by a processor corresponding to the controller 21. That is, the functions of the control apparatus 20 are realized by software. The control program causes a computer to execute the operations of the control apparatus 20, thereby causing the computer to function as the control apparatus 20. That is, the computer executes the operations of the control apparatus 20 in accordance with the control program to thereby function as the control apparatus 20.

The program can be recorded on a non-transitory computer readable medium. The non-transitory computer readable medium is, for example, a magnetic recording device, an optical disc, a magneto-optical recording medium, or a semiconductor memory. The program is distributed by sale, transfer of ownership, or rental of a portable recording medium such as a DVD or a CD-ROM on which the program is recorded. The term "DVD" is an abbreviation of digital versatile disc. The term "CD-ROM" is an abbreviation of compact disc read only memory. The program may be distributed by storing the program in a storage of a server and transferring the program from the server to another computer. The program may be provided as a program product.

The computer temporarily stores in a main memory, for example, a program recorded on a portable recording medium, or a program transferred from the server. Then, the computer reads the program stored in the main memory using a processor, and executes processes in accordance with the read program using the processor. The computer may read a program directly from the portable recording medium, and execute processes in accordance with the program. The computer may, each time a program is transferred from the server to the computer, sequentially execute processes in accordance with the received program. Instead of transferring a program from the server to the computer, processes may be executed by a so-called ASP type service that realizes functions only by execution instructions and result acquisitions. The term "ASP" is an abbreviation of application service provider. Programs encompass information that is to be used for processing by an electronic computer and is thus equivalent to a program. For example, data that is not a direct command to a computer but has a property that regulates processing of the computer is "equivalent to a program" in this context.

Some or all of the functions of the control apparatus 20 may be realized by a dedicated circuit corresponding to the controller 21. That is, some or all of the functions of the control apparatus 20 may be realized by hardware.

Figure 3:
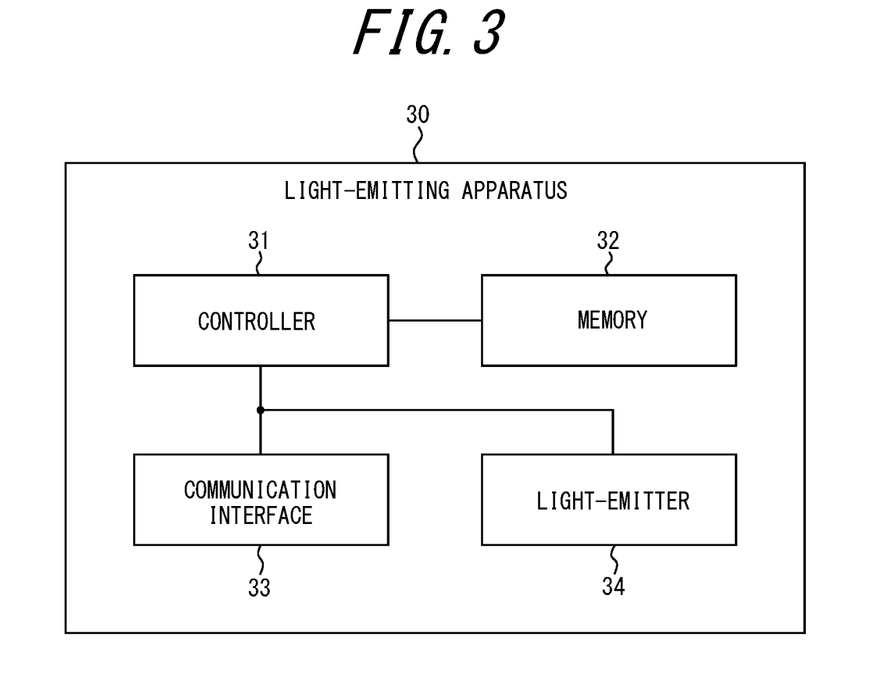
FIG. 3 is a block diagram illustrating a configuration of a light-emitting apparatus according to the present embodiment.

With reference to FIG. 3, a configuration of the light-emitting apparatus 30 according to the present embodiment will be described. The light-emitting apparatus 30 includes a controller 31, a memory 32, a communication interface 33, and a light-emitter 34.

The controller 31 includes at least one processor, at least one dedicated circuit, or a combination thereof. The processor is a general purpose processor such as a CPU or a GPU, or a dedicated processor that is dedicated to specific processing. The dedicated circuit is, for example, an FPGA or an ASIC. The controller 31 executes processing related to operations of the light-emitting apparatus 30 while controlling each component of the light-emitting apparatus 30. The controller 31 receives an instruction to turn on or off a light-emitting element of the light-emitter 34 from the control apparatus 20 via the communication interface 33. According to the instruction, the controller 31 controls the light-emitter 34 to turn the light-emitting element on or off.

The memory 32 includes at least one semiconductor memory, at least one magnetic memory, at least one optical memory, or a combination of at least two of these. The semiconductor memory is, for example, RAM or ROM. The RAM is, for example, SRAM or DRAM. The ROM is, for example, EEPROM. The memory 32 functions as, for example, a main memory, an auxiliary memory, or a cache memory. The memory 32 stores information for use in operations of the light-emitting apparatus 30 and information resulting from operations of the light-emitting apparatus 30.

The communication interface 33 includes at least one interface for communication. The interface for communication is, for example, an interface compliant with a mobile communication standard such as LTE, the 4G standard, or the 5G standard, an interface compliant with a short-range wireless communication standard such as Bluetooth®, or a LAN interface. The term "LTE" is an abbreviation of Long Term Evolution. The term "4G" is an abbreviation of 4th generation. The term "5G" is an abbreviation of 5th generation. The communication interface 33 receives information used for operations of the light-emitting apparatus 30 and transmits information resulting from operations of the light-emitting apparatus 30.

The light-emitter 34 includes at least one light-emitting element and a control circuit thereof. Specific, non-limiting examples of the light-emitting element include an LED and an organic EL.

The light-emitting apparatuses 30 are tack-shaped and are laid intermittently on the road. The portion of the light-emitting apparatus 30 that is exposed on the road is covered by a transparent cover. This enables pedestrians on the road to see the light emitted by the light-emitting element of the light-emitter 34. FIG. 1 illustrates a portion of a plurality of light-emitting apparatuses 30, installed on a road R, emitting light to indicate a crosswalk on the road R.

With reference to FIG. 1, FIGS. 4A, 4B, and 5, operations for processes by the controller 21 of the control apparatus 20 according to the present embodiment will be described. These operations correspond to a method according to the present embodiment.

Figure 4A:
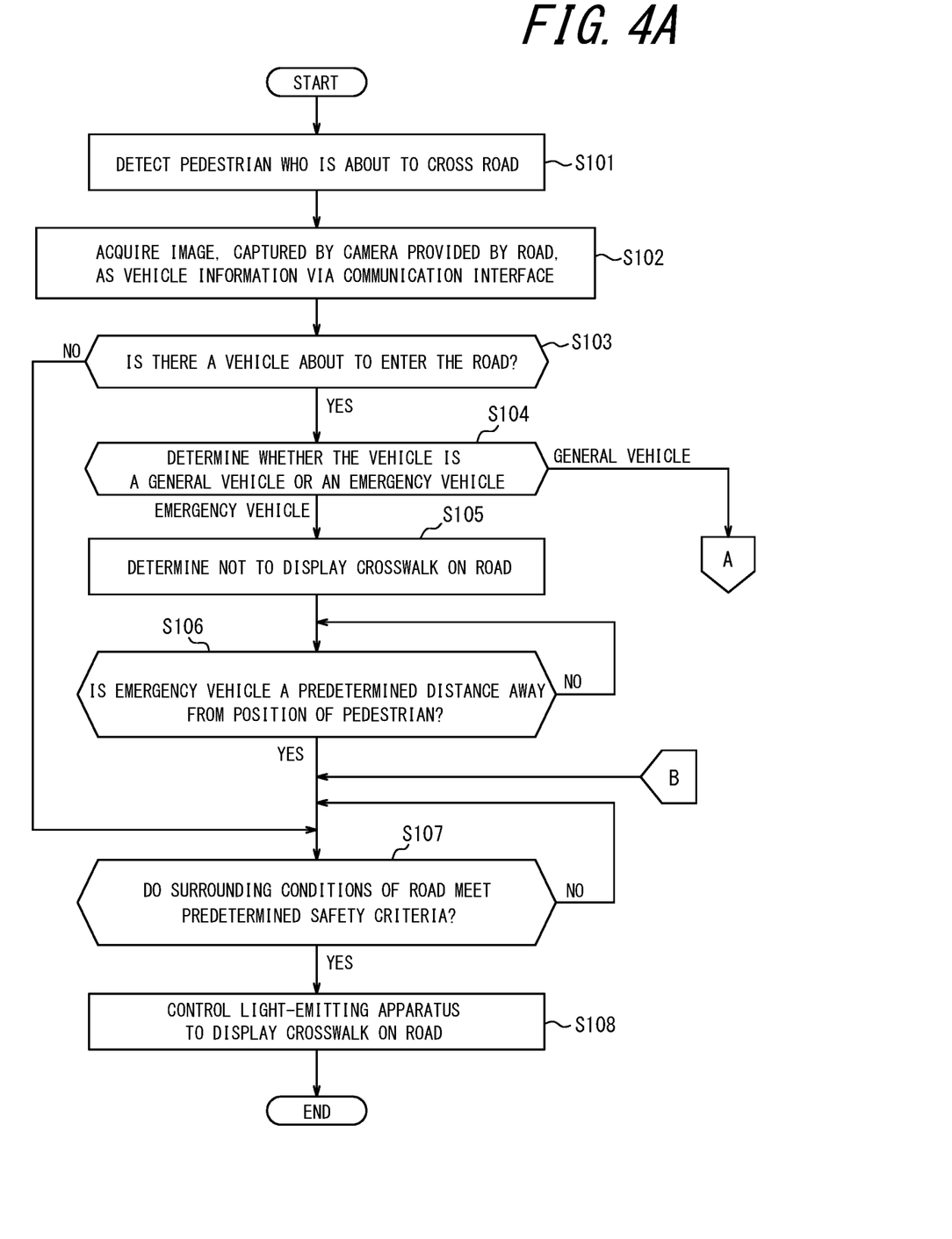
FIG. 4A is a diagram illustrating processes by a controller of the control apparatus according to present embodiment.

In step S101 of FIG. 4A, the controller 21 of the control apparatus 20 detects a pedestrian who is about to cross the road.

Any appropriate method can be employed to detect a pedestrian. For example, the controller 21 may acquire, via the communication interface 23, a road crossing request from a terminal apparatus used by the pedestrian, and detect the pedestrian as a pedestrian who is about to cross the road. Alternatively, the controller 21 may acquire, from the terminal apparatus used by the pedestrian, information on a planned path of the pedestrian, provided by a route guidance application that is being executed, and positional information indicating the position of the pedestrian. The controller 21 may then detect, from these acquired pieces of information, a pedestrian who arrives near the road as a pedestrian who is about to cross the road. Alternatively, the controller 21 communicates via the communication interface 23 with floor coverings provided around the road and equipped with load sensors. The controller 21 may then detect the pedestrian by receiving, from the floor coverings, a signal by the load sensor indicating that the pedestrian has performed a predetermined action. In this case, the predetermined action includes, for example, the action of a pedestrian pressing down with a foot on a crossing request switch provided on the floor covering. Alternatively, the controller 21 may communicate via the communication interface 23 with a camera that captures images of the surroundings of the road and may receive and analyze the images captured by the camera. The controller 21 may then detect, as a result of the analysis, a pedestrian who performs a predetermined action, such as raising a hand in the vicinity of the road, as a pedestrian who is about to cross the road.

Figure 1:
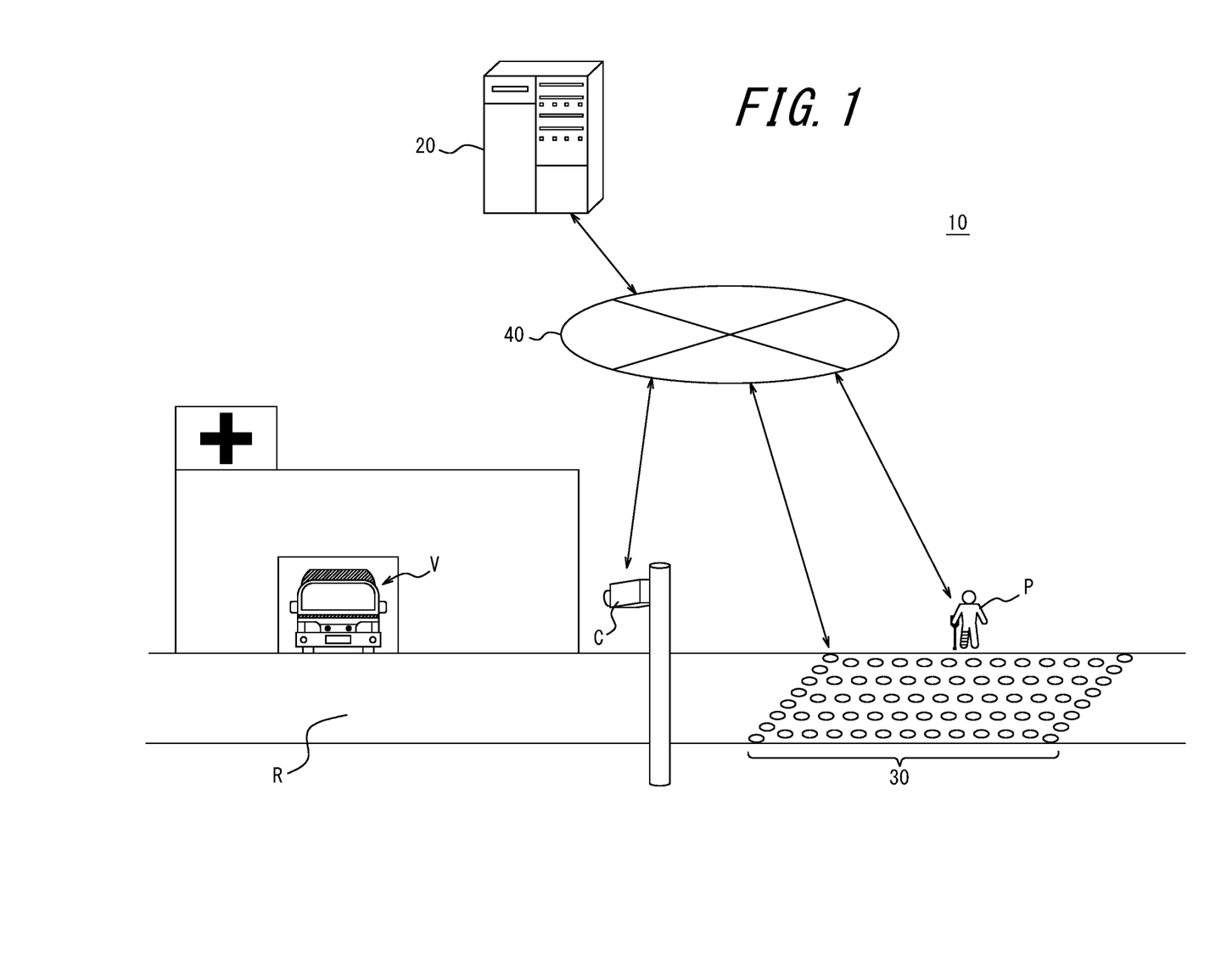
FIG. 1 is a diagram illustrating a configuration of a system according to the present embodiment.

For example, a pedestrian P in FIG. 1 transmits a crossing request for a road R to the control apparatus 20 from the terminal apparatus used by the pedestrian P. The controller 21 acquires the crossing request and detects the pedestrian P as a pedestrian who is about to cross the road R.

In step S102, the controller 21 acquires an image, captured by a camera installed by the road, as vehicle information via the communication interface 23.

The camera can be installed indoors or outdoors. The controller 21 constantly or periodically receives images, captured by the camera, via the communication interface 23. As illustrated in FIG. 1, a camera C is provided, for example, near an exit of a hospital H, which is a building facing the road R, and is capable of capturing images of a vehicle V entering the road R. Without being limited to the example illustrated in FIG. 1, the camera C may be installed in a parking lot inside the hospital H.

Figure 5:
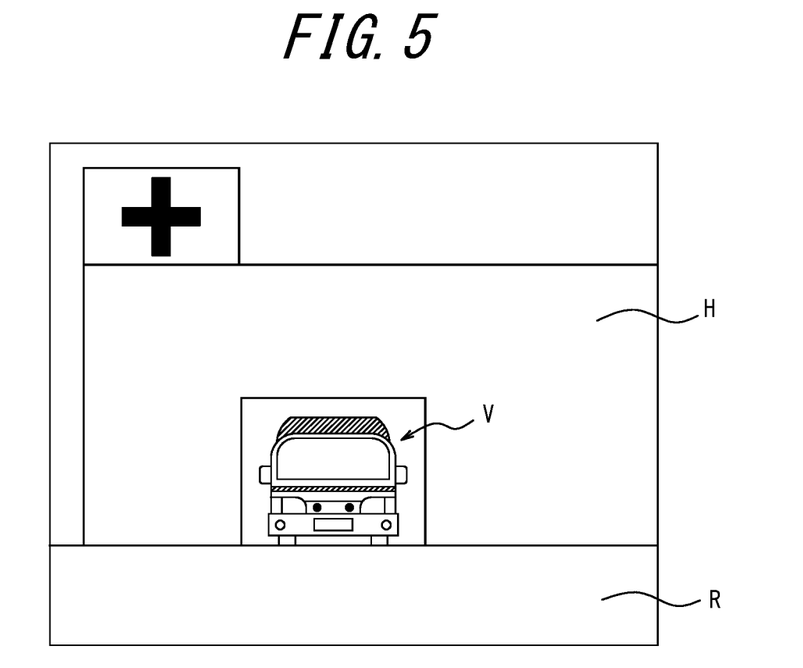
FIG. 5 is a diagram illustrating an example of an image as vehicle information according to the present embodiment.

FIG. 5 illustrates an example of an image received by the controller 21 from the camera C of FIG. 1. A vehicle V about to enter the road R from the exit of the hospital H is illustrated in the image in FIG. 5. In this way, the vehicle information includes information indicating whether there is a vehicle about to enter the road. In the image in FIG. 5, the vehicle V is an ambulance. In this way, the vehicle information includes information indicating whether the vehicle is a general vehicle or an emergency vehicle. The "emergency vehicle" refers to a vehicle that needs to move quickly for an emergency matter. Examples of emergency vehicles include ambulances, fire trucks, and police vehicles. The "general vehicle" refers to all vehicles other than emergency vehicles, including private vehicles.

The format of the vehicle information is not limited to images captured by a camera. For example, the controller 21 may acquire vehicle model information indicating the model of the vehicle and vehicle positional information indicating the position of the vehicle from the vehicle itself as the vehicle information. Alternatively, the controller 21 may acquire the planned path of the vehicle, provided by a route guidance application that is being executed, as the vehicle information. In this case, the presence of a vehicle about to enter a road is indicated by whether there is a road within a predetermined distance in front of the vehicle's direction of travel. Alternatively, the controller 21 may acquire the vehicle information by receiving, from the vehicle, an image captured by an in-vehicle camera provided in the vehicle.

The acquired image in this case indicates the surrounding conditions as seen from the driver's seat and indicates whether the vehicle is about to enter a road. In this way, the controller 21 can employ any appropriate method to acquire vehicle information including information indicating whether there is a vehicle about to enter the road.

In step S103, the controller 21 determines, from the acquired vehicle information, whether there is a vehicle about to enter the road. In a case in which there is no vehicle about to enter the road, the process by the controller 21 advances to step S107. In a case in which there is a vehicle about to enter the road, the process by the controller 21 advances to step S104.

Specifically, the controller 21 analyzes the image received as the vehicle information to determine whether there is a vehicle about to enter the road. Any appropriate image analysis method can be used for analyzing the image, such as machine learning. For example, from the image illustrated in FIG. 5, the controller 21 determines that there is a vehicle V that is about to enter the road.

The information that the controller 21 can read from the vehicle information is not limited to this example. For example, the controller 21 may be able to read information such as whether a person has just boarded the vehicle. This enables the controller 21 to determine that the vehicle is departing from a parking lot or building facing a road and will enter the road in the near future.

In step S104, the controller 21 determines whether the vehicle is a general vehicle or an emergency vehicle. In a case in which the vehicle is an emergency vehicle, the process by the controller 21 advances to step S105. In a case in which the vehicle is a general vehicle, the process by the controller 21 advances to step S201 illustrated in FIG. 4B.

Specifically, the controller 21 analyzes the image received as vehicle information to determine whether the vehicle in the image is a general vehicle or an emergency vehicle. For example, in the image illustrated in FIG. 5, the vehicle V that is about to enter the road is an ambulance. The controller 21 therefore determines that the vehicle is an emergency vehicle. The conditions for the determination by the controller 21 can be freely set. For example, the controller 21 may determine whether the vehicle is an emergency vehicle or a general vehicle based on the shape of the vehicle body. The controller 21 may determine that the vehicle is an emergency vehicle in a case in which the vehicle is equipped with warning lights or emits a siren sound, and may determine that all non-emergency vehicles are general vehicles.

First, a case in which the vehicle is determined to be an emergency vehicle in step S104, and the process by the controller 21 advances to step S105, will be described. In step S105, the controller 21 determines not to display the crosswalk on the road.

In the case in which the controller 21 determines not to display the crosswalk, the controller 21 may transmit a signal to the light-emitting apparatus 30 to eliminate the crosswalk. In this case, the light-emitting apparatus 30 receives the signal and turns off the light-emitter 34 in a case in which the light-emitter 34 is lit. In this way, the crosswalk can be reliably eliminated even in a case in which the crosswalk is still being displayed by the light-emitting apparatus 30. This enables the controller 21 to prevent movement of emergency vehicles from being hindered by the crosswalk being displayed.

Subsequently, in step S106, the controller 21 determines whether the emergency vehicle has moved a predetermined distance away from the position of the pedestrian. The controller 21 repeats the process in step S106 until it is determined that the emergency vehicle has moved a predetermined distance away. In a case in which it is determined that the emergency vehicle has moved a predetermined distance away, the process by the controller 21 advances to step S107.

Specifically, the controller 21 first acquires, via the communication interface 23, positional information indicating the position of the pedestrian and positional information for the emergency vehicle. Any appropriate method may be employed to acquire these pieces of positional information. The controller 21 receives and acquires, for example, positional information for the pedestrian and for the emergency vehicle from a terminal apparatus used by the pedestrian and from the emergency vehicle, respectively. Based on the acquired positional information indicating the position of the pedestrian and the positional information for the emergency vehicle, the controller 21 determines whether the position of the emergency vehicle is a predetermined distance away from the position of the pedestrian. Here, the predetermined distance is, for example, 100 meters. This enables the controller 21 to determine whether the emergency vehicle has reliably moved away from the pedestrian's position, so that the pedestrian can safely cross the road.

Figure 4B:
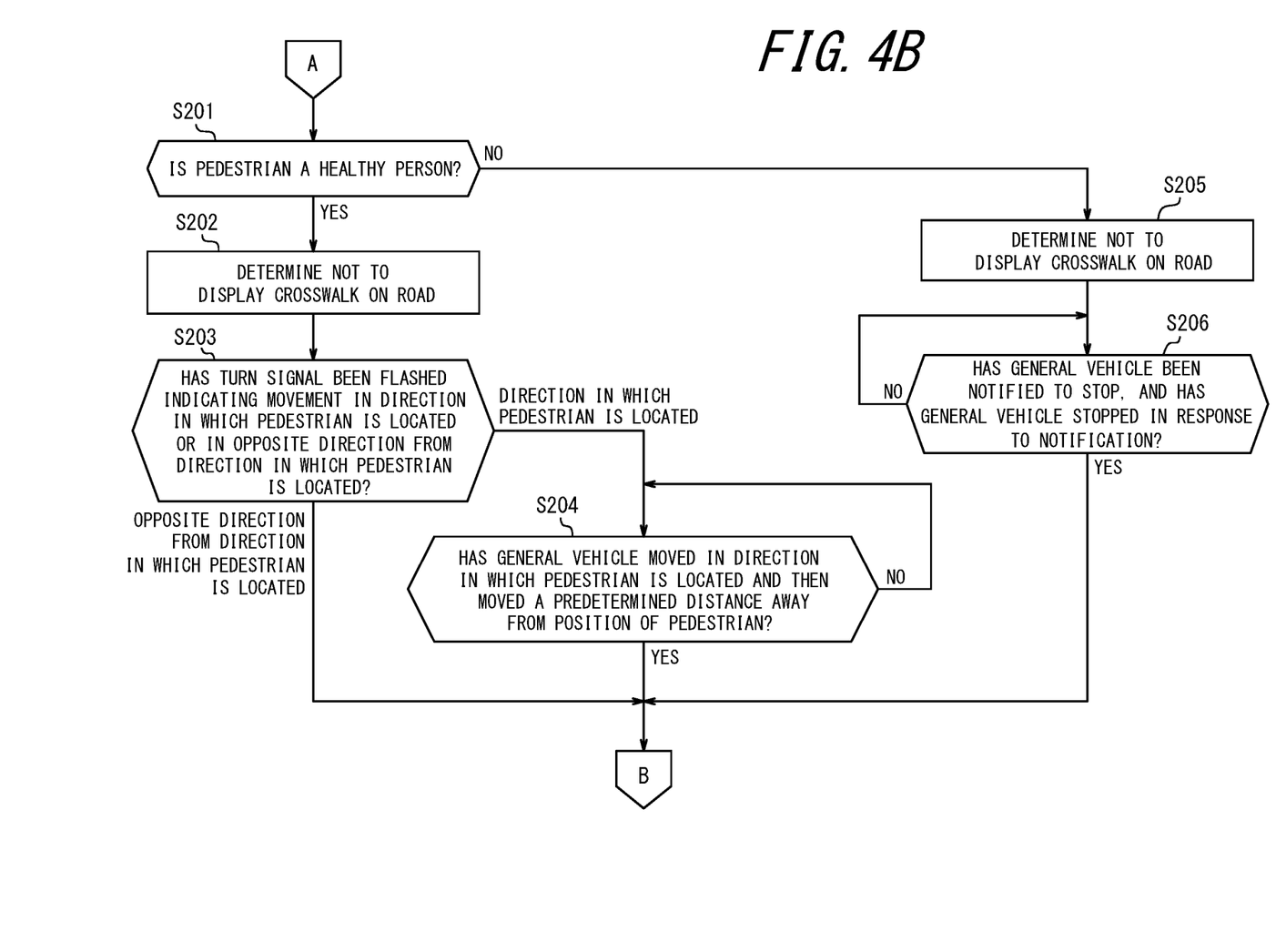
FIG. 4B is a diagram illustrating processes by the controller of the control apparatus according to present embodiment.

Subsequently, a case in which the vehicle is determined to be a general vehicle in step S104 and the process by the controller 21 advances to step S201 will be described with reference to FIG. 4B. At step S201, the controller 21 further acquires information on whether the pedestrian who is about to cross the road is a healthy person and determines whether the pedestrian is a healthy person. In a case in which it is determined that the pedestrian is a healthy person, the process by the controller 21 advances to step S202. In a case in which it is determined that the pedestrian is not a healthy person, the process by the controller 21 advances to step S205.

A "healthy person" is a person who is able to walk at an adult speed (such as 3 kilometers per hour) and who has no physical injury, illness, or disability. The criteria for being a healthy person may be set freely, but in this example, people who are preferably assisted when walking, such as an elderly person or a pregnant woman, are not included among healthy people. Any appropriate method can be employed to acquire information on whether a pedestrian is a healthy person. For example, the controller 21 may receive, via the communication interface 23, a terminal ID from a terminal apparatus used by the pedestrian. Next, the controller 21 reads pedestrian information registered in association with the terminal ID from a database registered in the memory 22. In this case, the pedestrian information includes information on the pedestrian's own body. The information on the pedestrian's own body can be registered in advance by the pedestrian. For example, the pedestrian P in FIG. 1 has a broken leg. The pedestrian P uses a terminal apparatus to transmit information to the control apparatus 20 indicating that the pedestrian P has a broken leg. The control apparatus 20 registers the information in advance in the pedestrian information in association with the terminal ID of the terminal apparatus used by the pedestrian P. In the process in step S201, the controller 21 can read the information for the pedestrian P from the pedestrian information and determine that the pedestrian P is not a healthy person.

Alternatively, the controller 21 may acquire information on whether the pedestrian is a healthy person by receiving an image captured by the camera that captures the surroundings of the road that the pedestrian is about to cross. In this case, the controller 21 can analyze the image and determine whether the pedestrian is a healthy person or not. Any appropriate image analysis method can be used for analyzing the image, such as machine learning. For example, people with crutches, people in wheelchairs, pregnant women, and the elderly are not determined to be healthy people. Additionally, in a case in which the pedestrian is determined to be with a child as a result of the image analysis, it may be determined that the pedestrian is not a healthy person.

Next, a case in which the process by the controller 21 advances to step S202 will be described. In step S202, the controller 21 determines not to display the crosswalk on the road. The process in step S202 is similar to the process in step S105 of FIG. 4A, and thus a description thereof is omitted.

Subsequently, in step S203, it is determined whether the general vehicle has flashed a turn signal indicating movement in the direction in which the pedestrian is located, or in the opposite direction from the direction in which the pedestrian is located. In a case in which it is determined that a turn signal has been flashed to indicate movement in the opposite direction from the direction in which the pedestrian is located, the process by the controller 21 returns to step S107 of FIG. 4A. Conversely, in a case in which it is determined that a turn signal has been flashed to indicate movement in the direction in which the pedestrian is located, the process by the controller 21 advances to step S204.

Any appropriate method can be employed to acquire information on whether a general vehicle has flashed a turn signal indicating movement in the direction in which the pedestrian is located or in the opposite direction from the direction in which the pedestrian is located. For example, the controller 21 may acquire positional information for the pedestrian from a terminal apparatus used by the pedestrian and may also receive and analyze an image captured by the camera installed by the road. It may then be determined whether the general vehicle is flashing a turn signal in either direction. Alternatively, the controller 21 may communicate with the general vehicle via the communication interface 23. In this case, a controller built into the general vehicle transmits information indicating the status of the turn signal operation to the control apparatus 20 via a communication interface built into the general vehicle. The controller 21 may determine whether the general vehicle is flashing a turn signal in either direction based on the information thus received from the general vehicle.

Next, a case in which the process by the controller 21 advances to step S204 will be described. In step S204, it is determined whether the general vehicle has moved in the direction in which the pedestrian is located and then moved a predetermined distance away from the position of the pedestrian. The process of step S204 is repeated until it is determined that general vehicle has moved in the direction in which the pedestrian is located and then moved a predetermined distance away from the position of the pedestrian. In a case in which the general vehicle is determined to have moved a predetermined distance away from the position of the pedestrian, the process by the controller 21 returns to step S107 of FIG. 4A.

Specifically, the controller 21 first acquires positional information indicating the position of the pedestrian and positional information for the general vehicle via the communication interface 23. Any appropriate method may be employed to acquire these pieces of positional information. The controller 21 receives and acquires, for example, positional information for the pedestrian and for the general vehicle from the terminal apparatus used by the pedestrian and from the general vehicle, respectively. Based on the acquired positional information indicating the position of the pedestrian and the positional information for the general vehicle, the controller 21 determines whether the position of the general vehicle is a predetermined distance away from the position of the pedestrian. Here, the predetermined distance is, for example, 100 meters. This enables determination of whether it is a situation in which a general vehicle has passed the position of the pedestrian and is far enough away from the position of the pedestrian for the pedestrian to cross the road safely.

Next, a case in which it is determined in step S201 that the pedestrian is not a healthy person, and the process by the controller 21 advances to step S205, will be described. In step S205, the controller 21 determines not to display the crosswalk on the road. The process in step S205 is similar to the process in step S105 of FIG. 4A, and thus a description thereof is omitted.

Subsequently, in step S206, the controller 21 transmits a notification to the general vehicle to stop and determines whether the general vehicle has stopped in response to the notification. The process in step S206 is repeated until it is determined that the general vehicle has stopped in response to the notification. In a case in which it is determined that the general vehicle has stopped in response to the notification, a process of the controller 21 ends, and the process returns to step S107 of FIG. 4A.

Any appropriate method may be employed to notify the general vehicle. For example, the controller 21 transmits a notification, via the communication interface 23, to the general vehicle to stop. In this case, the controller of the general vehicle receives the notification via the communication interface of the general vehicle and controls each part of the vehicle according to the notification to stop the general vehicle. The controller of the general vehicle may use audio or images to notify the driver to stop.

Any appropriate method may be employed to determine that the general vehicle has stopped in response to the notification. For example, the controller 21 acquires positional information for the general vehicle and determines whether the general vehicle has stopped. Alternatively, the controller 21 may receive an image captured by the camera that captures images of the road and analyze the image to determine whether the general vehicle has stopped. Alternatively, the controller 21 may receive an image captured by an in-vehicle camera provided in the general vehicle and analyze the image to determine whether the general vehicle has stopped.

Referring again to FIG. 4A, next, in step S107, it is determined whether the surrounding conditions of the road meet predetermined safety criteria. The process of step S107 is repeated until it is determined that the surrounding conditions of the road meet the predetermined safety criteria. In a case in which it is determined that the surrounding conditions of the road meet the predetermined safety criteria, the process by the controller 21 advances to step S108.

The safety criteria are criteria for pedestrians to cross the road safely and may be set freely. Safety criteria include, for example, that within a predetermined distance from the position of the pedestrian, there are no approaching vehicles or bicycles traveling at or above a predetermined speed on the road the pedestrian is about to cross. In this case, the controller 21 receives, via the communication interface 23, images from a camera that captures images of the road and is provided within a predetermined range from the position of the pedestrian. The predetermined range may, for example, refer to a distance of 500 meters, but this example is not limiting. The controller 21 analyzes the received image and determines whether there is an approaching vehicle or bicycle traveling at or above a predetermined speed. In this way, the controller 21 determines whether the safety criteria are met. Alternatively, the controller 21 may acquire, via the communication interface 23, respective positional information from vehicles or bicycles traveling around the position where the pedestrian is located and detect approaching vehicles or bicycles traveling at or above a predetermined speed based on the positional information.

Subsequently, in step S108, the controller 21 controls the light-emitting apparatus 30 to display a crosswalk on the road. Thereafter, the process by the controller 21 ends.

Specifically, the controller 21 first selects one or more light-emitting apparatuses 30 to control from among a plurality of light-emitting apparatuses 30 provided on the road. The selection of the light-emitting apparatus 30 may be based on the width, shape, direction, and the like of the crosswalk to be displayed, in addition to the position of the pedestrian. The position of the light-emitting apparatus 30 may be stored in advance in the memory 22 of the control apparatus 20. The controller 21 transmits a signal, via the communication interface 23, to the selected one or more light-emitting apparatuses 30 to turn on the light-emitter 34.

The controller 31 of each of the one or more light-emitting apparatuses 30 receives the signal from the control apparatus 20 via the communication interface 33 and turns on or flashes the respective light-emitter 34. The light emitted by each light-emitter 34 forms the shape of a crosswalk as a whole. In this way, a crosswalk is displayed to the pedestrian on the road, enabling the pedestrian to cross the road safely.

In addition to being an apparatus that displays the crosswalk using the light-emitter 34, the light-emitting apparatus 30 may also be a projection apparatus that is provided at the side of the road and is capable of projecting an image of the crosswalk anywhere on the road. In this case, the light-emitting apparatus 30 as a projection apparatus can project an image of a crosswalk on the road according to the signal from the control apparatus 20.

As described above, the control apparatus 20 according to the present embodiment displays a crosswalk on a road upon detecting a pedestrian who is about to cross the road. The control apparatus 20 includes the controller 21 that acquires vehicle information including information indicating whether there is a vehicle about to enter the road and determines whether to display the crosswalk based on the vehicle information.

The controller 21 can flexibly determine whether to display the crosswalk according to whether there is a vehicle entering the road. Since a crosswalk can be displayed for pedestrians only in a case in which vehicles are guaranteed not to be present, the safety of pedestrians when crossing the road can be improved.

As described above, in the control apparatus 20, the controller 21 determines to display a crosswalk in a case in which there is no vehicle about to enter the road, provided that the predetermined safety criteria are met.

The controller 21 can display the crosswalk only in a case in which there is no vehicle about to enter the road and the predetermined safety criteria are met. Since a crosswalk can be displayed for pedestrians only in a case in which vehicles are guaranteed not to be present, the safety of pedestrians when crossing the road can be improved.

As described above, in the control apparatus 20, the vehicle information includes information indicating whether the vehicle about to enter the road is a general vehicle or an emergency vehicle. The controller 21 determines not to display the crosswalk in a case in which the emergency vehicle is about to enter the road.

The controller 21 does not display the crosswalk in a case in which the vehicle about to enter the road is an emergency vehicle. This prevents pedestrians from crossing the road even in a case in which an emergency vehicle suddenly changes its direction of travel, thereby improving safety for pedestrians when crossing the road. This also prevents crosswalks from hindering the passage of emergency vehicles, thereby contributing to the smooth flow of road traffic.

As described above, in the control apparatus 20, the controller 21 determines to display the crosswalk in a case in which the emergency vehicle has moved a predetermined distance away from the position of the pedestrian, provided that the predetermined safety criteria are met.

The controller 21 can display the crosswalk only in a case in which the emergency vehicle moves away from the position of the pedestrian and the predetermined safety criteria are met. Since a crosswalk can be displayed for pedestrians only in a case in which vehicles are guaranteed not to be present, the safety of pedestrians when crossing the road can be improved.

As described above, in the control apparatus 20, the controller 21 determines to display the crosswalk in a case in which a general vehicle flashes a turn signal indicating movement in the opposite direction from the direction in which the pedestrian is located, provided that the predetermined safety criteria are met.

In a case in which a general vehicle flashes a turn signal indicating movement in the opposite direction from the direction in which the pedestrian is located, it is more likely that the general vehicle will move away from where the pedestrian is located, and that the pedestrian will be able to cross the road safely. At this time, the controller 21 displays the crosswalk provided that the predetermined safety criteria are met. This can improve the safety of pedestrians when crossing the road, without making them wait too long.

As described above, in the control apparatus 20, the controller 21 determines to display the crosswalk in a case in which the general vehicle moves in the direction in which the pedestrian is located and then moves a predetermined distance away from the position of the pedestrian, provided that the predetermined safety criteria are met.

In a case in which a general vehicle moves in the direction in which the pedestrian is located, passes the position of the pedestrian, and then moves a predetermined distance away, it is more likely that the pedestrian can cross the road safely. At this time, the controller 21 displays the crosswalk provided that the predetermined safety criteria are met. In this way, the control apparatus 20 can enable the pedestrian to cross the road as soon as it is safe to do so.

As described above, in the control apparatus 20, the controller 21 further acquires information on whether the pedestrian is a healthy person, and determines not to display the crosswalk in a case in which the pedestrian is a healthy person and the general vehicle is about to enter the road.

The controller 21 does not display the crosswalk in a case in which the pedestrian is a healthy person and there is a general vehicle about to enter the road. This can prevent healthy people who are unaware of the vehicle about to enter the road from attempting to cross the road. Therefore, the safety of pedestrians when crossing the road can be improved more reliably.

As described above, in the control apparatus 20, the controller 21 determines not to display the crosswalk in a case in which the pedestrian is not a healthy person and the general vehicle is about to enter the road.

The controller 21 does not display the crosswalk in a case in which the pedestrian is not a healthy person and there is a general vehicle about to enter the road. This can prevent pedestrians who require extra assistance, such as pedestrians who walk slowly, from attempting to cross the road in a case in which there is a vehicle about to enter the road. Therefore, the safety of pedestrians when crossing the road can be improved more reliably.

As described above, in the control apparatus 20, the controller 21 transmits a notification to the general vehicle to stop and determines to display the crosswalk in a case in which the general vehicle stops in response to the notification, provided that the predetermined safety criteria are met.

By notifying the general vehicle to stop in a case in which a pedestrian is crossing the road, the controller 21 can make the driver of the general vehicle aware of the pedestrian and encourage the driver to drive carefully, even in a case in which the driver is at a position where the pedestrian cannot be seen. Furthermore, the controller 21 can display a crosswalk only in a case in which predetermined safety criteria are met, thereby improving safety for pedestrians when crossing the road.

As described above, the control apparatus 20 includes the communication interface 23. The controller 21 acquires, via the communication interface 23, an image captured by a camera installed by the road as the vehicle information.

The controller 21 acquires the image, captured by the camera, as vehicle information and analyzes the image to determine whether there is a vehicle. This enables the controller 21 more accurately to check, in real time, the surrounding conditions of the road that the pedestrian is about to cross. Therefore, the safety of pedestrians when crossing the road can be improved more reliably.

The present disclosure is not limited to the embodiment described above. For example, a plurality of blocks described in the block diagrams may be integrated, or a block may be divided. Instead of executing a plurality of steps described in the flowcharts in chronological order in accordance with the description, the plurality of steps may be executed in parallel or in a different order according to the processing capability of the apparatus that executes each step, or as required. Other modifications can be made without departing from the spirit of the present disclosure.

For example, the controller 21 may determine, in a case in which a general vehicle is about to enter the road, whether the pedestrian who is about to cross the road is in a hurry, and judge whether to display the crosswalk according to the result of the determination. Specifically, upon detecting a pedestrian who is about to cross the road, the controller 21 also detects the moving speed of the pedestrian until the pedestrian arrives at the road. The detection of the moving speed may be performed by receiving, via the communication interface 23, a record of a value measured by an acceleration sensor from a terminal apparatus used by the pedestrian. Alternatively, the controller 21 may continuously acquire positional information for the terminal apparatus used by the pedestrian, and calculate the past average moving speed from the positional information. In a case in which the detected moving speed of the pedestrian is equal to or greater than a predetermined value, the controller 21 notifies the general vehicle to stop. The predetermined value is, for example, a value of 5 kilometers per hour. The controller 21 can then control the light-emitting apparatus 30 to display the crosswalk provided that the predetermined safety criteria are met. In this way, in a case in which a pedestrian is in a hurry, the controller 21 may stop the general vehicle, check for safety, and then display the crosswalk to the pedestrian. The safety of pedestrians when crossing the road can thereby be improved, while also ensuring convenience for pedestrians.

The invention claimed is:

1. A control apparatus for displaying a crosswalk on a road upon detecting a pedestrian who is about to cross the road, the control apparatus comprising a controller configured to:
    acquire vehicle information including information indicating whether there is a vehicle about to enter the road; and
    determine whether to display the crosswalk based on the vehicle information, wherein
    the vehicle information includes information indicating whether a vehicle about to enter the road is a general vehicle or an emergency vehicle, and
    the controller is configured to determine not to display the crosswalk in a case in which the emergency vehicle is about to enter the road.

2. The control apparatus of claim 1, wherein the controller is configured to determine to display the crosswalk in a case in which there is no vehicle about to enter the road, provided that predetermined safety criteria are met.

3. The control apparatus of claim 1, wherein the controller is configured to determine to display the crosswalk in a case in which the emergency vehicle has moved a predetermined distance away from a position of the pedestrian, provided that predetermined safety criteria are met.

4. The control apparatus of claim 1, wherein the controller is configured to determine to display the crosswalk in a case in which the general vehicle flashes a turn signal indicating movement in an opposite direction from a direction in which the pedestrian is located, provided that predetermined safety criteria are met.

5. The control apparatus of claim 1, wherein the controller is configured to determine to display the crosswalk in a case in which the general vehicle moves in a direction in which the pedestrian is located and then moves a predetermined distance away from a position of the pedestrian, provided that predetermined safety criteria are met.

6. The control apparatus of claim 1, wherein the controller is further configured to:
    acquire information on whether the pedestrian is a healthy person; and
    determine not to display the crosswalk in a case in which the pedestrian is a healthy person and the general vehicle is about to enter the road.

7. The control apparatus of claim 6, wherein the controller is configured not to display the crosswalk in a case in which the pedestrian is not a healthy person and the general vehicle is about to enter the road.

8. The control apparatus of claim 1, wherein the controller is configured to:
    transmit a notification to the general vehicle to stop; and
    determine to display the crosswalk in a case in which the general vehicle stops in response to the notification, provided that predetermined safety criteria are met.

9. The control apparatus of claim 1, further comprising a communication interface, wherein
    the controller is configured to acquire, via the communication interface, an image captured by a camera installed by the road as the vehicle information.

10. A method to be executed by a control apparatus for displaying a crosswalk on a road upon detecting a pedestrian who is about to cross the road, the method comprising:

acquiring vehicle information including information indicating whether there is a vehicle about to enter the road; and determining whether to display the crosswalk based on the vehicle information, wherein the vehicle information includes information indicating whether a vehicle about to enter the road is a general vehicle or an emergency vehicle, and the method further comprises determining not to display the crosswalk in a case in which the emergency vehicle is about to enter the road.

11. The method of claim 10, further comprising determining to display the crosswalk in a case in which there is no vehicle about to enter the road, provided that predetermined safety criteria are met.

12. The method of claim 10, further comprising determining to display the crosswalk in a case in which the emergency vehicle has moved a predetermined distance away from a position of the pedestrian, provided that predetermined safety criteria are met.

13. The method of claim 10, further comprising:

acquiring information on whether the pedestrian is a healthy person; and determining not to display the crosswalk in a case in which the pedestrian is a healthy person and the general vehicle is about to enter the road.

14. A non-transitory computer readable medium storing a program configured to cause a computer, as a control apparatus for displaying a crosswalk on a road upon detecting a pedestrian who is about to cross the road, to execute operations, the operations comprising:

acquiring vehicle information including information indicating whether there is a vehicle about to enter the road; and determining whether to display the crosswalk based on the vehicle information, wherein the program causes the computer to execute the operations further comprising determining to display the crosswalk in a case in which there is no vehicle about to enter the road, provided that predetermined safety criteria are met.

15. The non-transitory computer readable medium of claim 14, wherein the vehicle information includes information indicating whether a vehicle about to enter the road is a general vehicle or an emergency vehicle, and the program causes the computer to execute the operations further comprising determining not to display the crosswalk in a case in which the emergency vehicle is about to enter the road.

16. The non-transitory computer readable medium of claim 15, wherein the program causes the computer to execute the operations further comprising determining to display the crosswalk in a case in which the emergency vehicle has moved a predetermined distance away from a position of the pedestrian, provided that predetermined safety criteria are met.

17. The non-transitory computer readable medium of claim 15, wherein the program causes the computer to execute the operations further comprising:

acquiring information on whether the pedestrian is a healthy person; and determining not to display the crosswalk in a case in which the pedestrian is a healthy person and the general vehicle is about to enter the road.

* * * * *